R. C. KNOWLES.
DEMOUNTABLE RIM FOR WHEELS.
APPLICATION FILED AUG. 7, 1913.

1,098,040.

Patented May 26, 1914.
2 SHEETS—SHEET 1.

Witnesses
Wm. C. Crickett
Nomie Welsh

Inventor
Roscoe C. Knowles.
By
Attorney

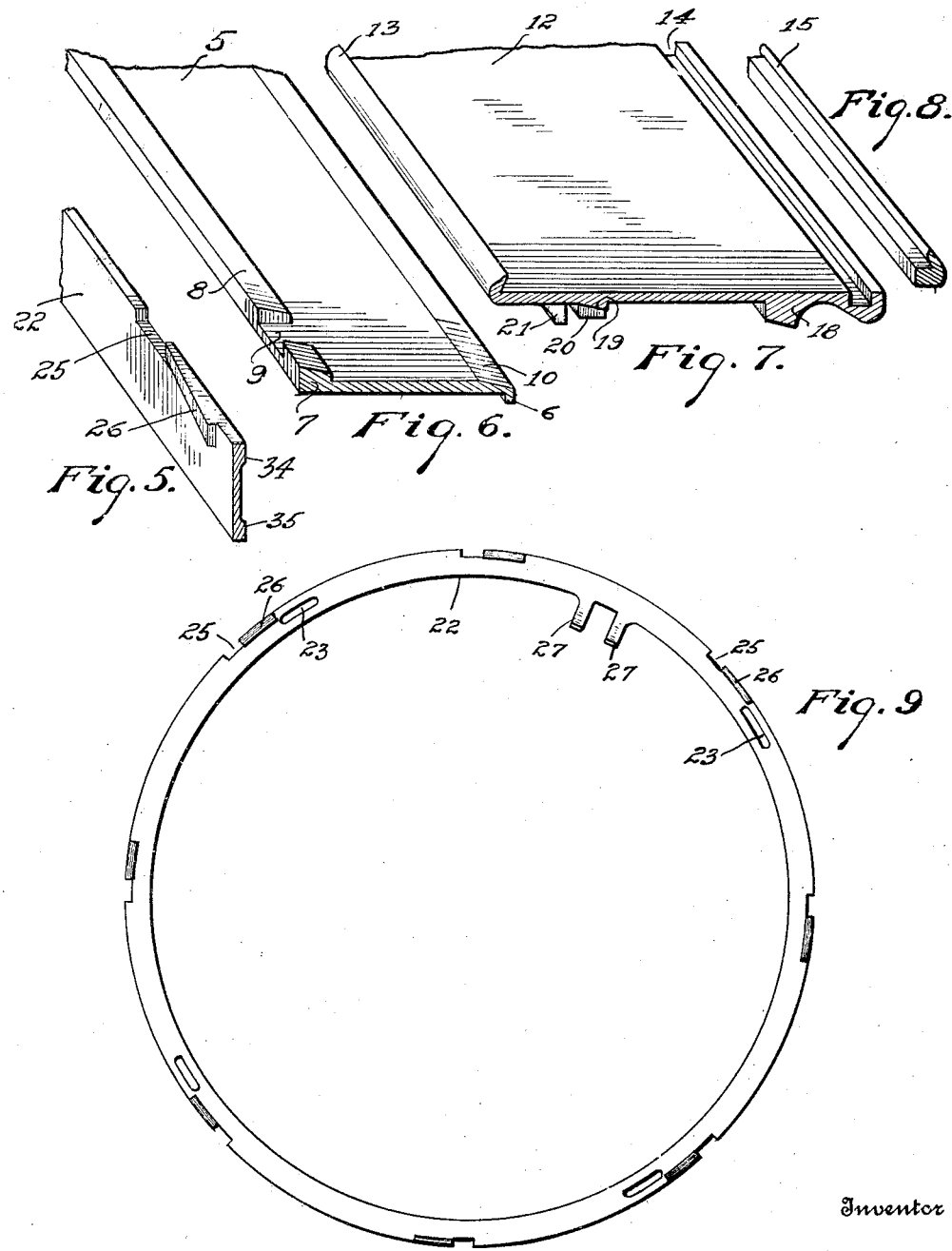

UNITED STATES PATENT OFFICE.

ROSCOE C. KNOWLES, OF EMPIRE, ALABAMA.

DEMOUNTABLE RIM FOR WHEELS.

1,098,040.  Specification of Letters Patent.  Patented May 26, 1914.

Application filed August 7, 1913. Serial No. 783,655.

*To all whom it may concern:*

Be it known that I, ROSCOE C. KNOWLES, a citizen of the United States of America, residing at Empire, in the county of Walker and State of Alabama, have invented certain new and useful Improvements in Demountable Rims for Wheels, of which the following is a specification.

My invention relates to vehicle wheel rims which comprise an inner rim made fast to the wheel felly and an outer demountable tire carrying rim which is slipped over the inner rim and made fast thereon by a locking mechanism which can be quickly and easily manipulated.

One object of my invention is to simplify and perfect the locking mechanism for the demountable rim and to this end that rim is provided with lips or tongues which interlock with the inner rim and overhang the side of the same, and a wedge locking means, preferably in the form of a ring, is held adjustably to the side of the felly and adapted to be adjusted so that the wedges engage between the overhanging lips and the inner rim and hold the demountable rim rigidly in place.

A further object of my invention is to devise a single simple means for adjusting the wedge-bearing locking ring and this I accomplish by means of a nut which is adjustable on a screw rigidly connected to the felly, the nut being interlocked with portions of the locking ring so that its adjustment rotates the ring.

My invention further comprises novel means for interlocking the rim sections against relative rotary movement and the several details of construction and arrangements of parts, all of which are hereinafter more particularly described and claimed, reference being had to the accompanying drawings which illustrate the preferred embodiment of my invention, and in which:—

Figure 4:
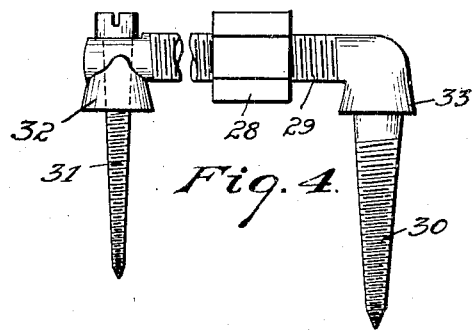
Figure 2:
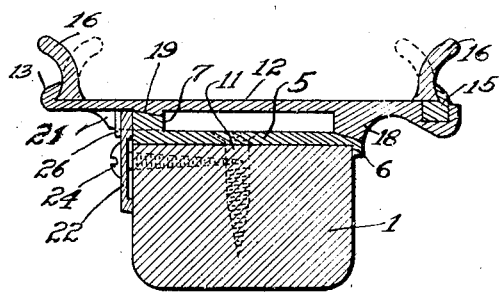
Figure 3:
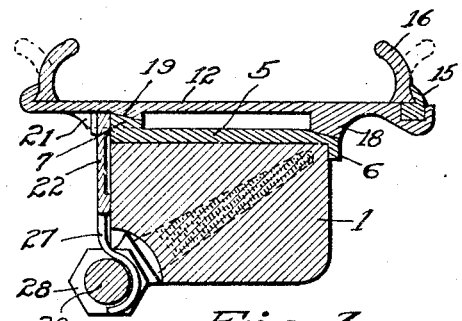
Figure 1:
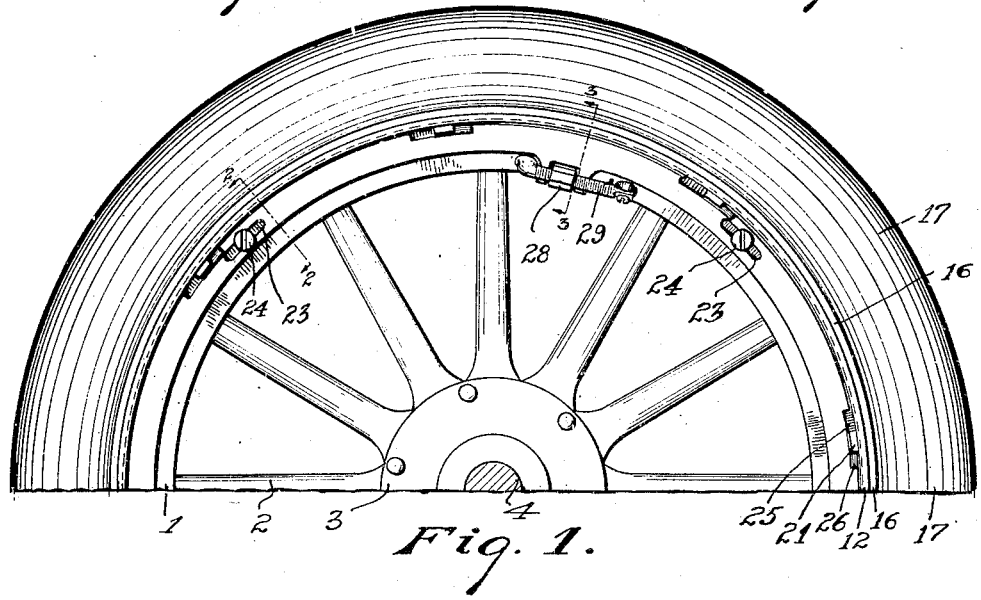

Figure 1 is a partial side elevation looking from the inner side of the wheel and showing my improved demountable rim in operating position. Fig. 2 is a cross-sectional view taken on the line 2—2 of Fig. 1. Fig. 3 is a similar view taken on the line 3—3 of Fig. 1. Fig. 4 is a detail view of the adjusting means for the locking ring. Figs. 5, 6, 7 and 8 are partial perspective views respectively of the wedge locking ring, inner rim, outer demountable rim, and detachable tire ring. Fig. 9 is a detail side elevation of the wedge locking ring.

Similar reference numerals refer to similar parts throughout the drawings.

I have illustrated my invention in connection with any standard type of wheel comprising a felly 1, spokes 2, and a hub 3 which is mounted on a shaft or axle 4. I mount on the felly the inner rim section 5 which is provided around one peripheral edge with an inturned annular flange 6 and along its opposite edge with an out-turned annular shoulder 7. The top face 8 of this shoulder 7 is beveled on an incline rising from the center of the felly and the shoulder has notches 9 which are cut therethrough at intervals and extend down flush with the outer face of the rim. The rim 5 has an annular beveled face 10 surrounding its peripheral edge adjacent to the flange 6, which flange overlaps the outer side of the felly while shoulder 7 stands flush with the inner side thereof. The rim 5 is held against rotation on the felly by a series of screws or bolts 11. The outer demountable rim 12, which holds the tire, is made wider than the rim 5 and is provided along one marginal edge with an annular upturned lip 13 and along the other edge with a groove 14 in which a split fastening ring 15 is adapted to be seated. Tire retaining rings 16 are adapted to engage the lip 13 and ring 15 and hold the tire 17 in place on rim 12. The rim 12 is provided on its underface with an annular shoulder 18, the underface of which is beveled to correspond with the bevel of the face 10 on rim 5. Near its other side the rim 12 is provided with an annular shoulder having a beveled underface which is adapted to engage and rest on the beveled face 8 on the rim 5. At intervals there project below this shoulder 19 lugs 20, there being one for each slot 9 and these lugs are adapted to fit into the slots 9 and thereby interlock the rims against relative rotary movement. In transverse alinement with each shoulder 20 and spaced therefrom is a depending lip 21 which is integral with rim 12 and is also adapted to be passed laterally through a notch 9 on the shoulder 7 when the rims are being assembled and which lips 21 then stand spaced from the inner side face of the felly and shoulder 7.

The locking means for holding the rims assembled comprise a locking ring 22, see Fig. 9, which is provided at intervals with longated radial slots 23 which receive screws 24 that hold the ring, free for rotary adjustment, to the inner side face of the felly. The ring is provided with a series of peripheral notches 25 and to one side of each notch 25 and projecting laterally from the ring is a wedge 26. The width of the notches 25 correspond with that of notches 9. The ring is provided along its inner peripheral edge with two spaced arms 27 which are disposed radially and near their free ends are bent outwardly on a curve, as seen in Fig. 3. These arms 27 are adapted to receive between them a nut 28 which is adjustable on a screw 29 about which the inner ends of the arms are bent. This screw is preferably constructed as shown in Fig. 4 and is provided with an integral threaded shank 30 at one end which is bent at right angles to the body of the screw. The rounded and unthreaded outer end of screw 29 is provided with an opening to receive a screw 31 which is passed down through said opening and through a washer 32, the upper portion of which is made thick and shaped to fit about the rounded end of screw 29. The screw shank 30 which has an offset 33 equivalent to the washer 32, is screwed into the lower outer corner of the felly at an upward inclination to give it the maximum purchase in the felly. After the shank 30 is screwed home, the screw 29 is turned in line with the felly, nut 28 is screwed onto 29, washer 32 is slipped under the outer end of 29, and the screw 31 passed down through 29 and 32 and screwed into the felly. In order to reduce the friction of the ring 22 as it is adjusted, the latter has its inner face cut away so as to leave top and bottom bearing faces 34 and 35 which alone engage the felly and rim 5

In operation, assuming the rim 5 and the locking ring 22 to have been mounted on the wheel felly in the manner described, the nut 28 is turned by hand or a suitable implement and as it is adjusted along the screw 29, it engages one or the other of the arms 27 and causes the ring to rotate. This adjustment continues until the notches 25 in the locking ring register with the notches 9 in the shoulder 7 of the inner rim. The tire having been mounted on the rim 12 the latter is ready to be mounted and this is done by holding the rim 12 in vertical position and moving it toward the car with its shoulders 20 resting first on the beveled face 10 of the rim 5 and then slipping onto its intermediate body portion. The rim 12 is then turned until its alining pairs of shoulders 20 and lips 21 come opposite the notches 9 and 25, whereupon the outer rim is shoved home, bringing its lips 21 into position beyond the outside face of the locking ring and in position to be engaged by its wedges 26. When in this position, the rim 12 is supported by the engagement of its similarly beveled shoulders 18 and 19 with the correspondingly beveled faces 8 and 10 of the rim 5. The operator now turns the nut 28 so as to adjust it to the left (Fig. 1) and as the locking ring is rotated counter-clockwise, its wedges 26 are gradually forced in between the inner rim and the lips 21 of the outer rim, thereby forcing the latter rim to its extreme inner position and holding it tightly in place on the inner rim.

The beveled engaging faces of the two rims in connection with the wedge locking ring gives a connection which will not rattle. By spacing the shoulders 18 and 19 so that the intermediate portions of the two rims are not in engagement, the frictional resistance of the rims when separated after they have been in long use is materially reduced.

What I claim as new and desire to secure by Letters Patent, is:—

1. In a tire fastening means, an inner rim having a peripheral notched shoulder near a side edge thereof, an outer and wider demountable rim which fits snugly over said inner rim and has inwardly disposed shoulders which fit into the notches in the shoulder on the inner rim and interlock the rims inwardly disposed lips on said demountable rim adapted to be passed through said notches in advance of said shoulders and to stand spaced from the inside edge of the inner rim when the two rims are assembled, in combination with adjustable wedge locking means adapted to be interposed between said lips and the inner rim to lock the demountable rim in engagement with the inner rim, substantially as described.

2. In a tire fastening means, an inner rim and means to attach it rigidly to a wheel, a notched raised beveled shoulder surrounding the inner side of said rim, an outer demountable rim beveled to fit snugly over said inner rim and shoulder and having at one side inwardly disposed lips which pass through said notches as the demountable rim is adjusted into operating position, projections on the demountable rim which fit into said notches and interlock the rims against turning relatively a wedge-bearing ring, and means to adjust it to insert its wedges between the inner rim and said lips on the demountable rim to interlock the rims against lateral movement, substantially as described.

3. In combination, a wheel felly, an inner metal rim fast thereon and having about its outer periphery a beveled face at one side and a notched shoulder at the other side having its out-turned face also beveled, an outer demountable rim having about its inner periphery two spaced annular beveled faces, one of which is on a shoulder and which are adapted to engage and rest on said beveled faces of the inner rim, and shoulders on the outer rim which engage in the notches in the shoulder of the inner rim, lips on the outer rim in transverse alinement each with a shoulder and adapted to pass through a notch and overhang the inner side of the inner rim, a ring adjustably connected to the inner side of the felly and having wedges adapted to engage between the lips and inner rim, and means to adjust said ring, substantially as described.

4. In combination, a wheel felly, a rim fastened about the periphery of the felly and having around each side a beveled face which faces are similarly beveled and separated by a circumferential groove, a demountable rim having similar beveled faces about its inner periphery, laterally disposed pairs of inturned projections spaced at intervals about the outer rim, said inner rim having notches to receive the inner projection of each pair, a wedge ring loosely fastened to the inner side face of the felly, and means to adjust said ring and force its wedges between the outer projection of each pair and the inner rim and felly.

5. In combination, a wheel felly having a demountable rim thereon, interlocking projections which hold the demountable rim against rotation on the wheel felly, and means to hold the demountable rim against lateral disengagement comprising inturned projections on the demountable rim which overhang the inner side face of the felly, a locking ring adjustably connected to the inner side face of the felly and having two spaced arms, a screw which extends along the felly, a nut adjustable on said screw and engaged on each side by said arms which extend below and engage the inner side of said screw, and wedges on the ring which are adapted to be interposed between the felly and said projections on the demountable rim, substantially as described.

6. In combination, a wheel felly, an inner metal rim fast thereon and having a raised notched shoulder at its inner side and a beveled face about its outer side, said shoulder having its outer face also beveled, a demountable rim having about its periphery two correspondingly beveled faces, one being on a raised shoulder, the beveled faces on the two rims being adapted to engage, lugs on the shoulder of the demountable rim which interlock in the notches of the shoulder of the inner rim, lips in transverse alinement with said lugs and adapted to be passed through said notches and to overhang the inner side of the felly, a locking ring adjustably attached to the inner side face of the felly, said ring having notches to correspond and register with those in the shoulder of the inner rim and through which ring notches said projections are passed, and inwardly facing wedges on said ring, one adjacent to each notch, and means to move said ring to interpose its wedges in the path of disengaging movement of said projections in the demountable rim, substantially as described.

In testimony whereof I affix my signature in presence of two witnesses.

ROSCOE C. KNOWLES.

Witnesses:
NOMIE WELSH,
WM. C. PRICKETT.

---

Copies of this patent may be obtained for five cents each, by addressing the "Commissioner of Patents, Washington, D. C."